United States Patent
Lifson (12)

(10) Patent No.: US 6,305,914 B1
(45) Date of Patent: Oct. 23, 2001

(54) COUNTERWEIGHT OF REDUCED SIZE

(75) Inventor: Alexander Lifson, Manlius, NY (US)

(73) Assignee: Scroll Technologies, Arkadelphia, AR (US)

(*) Notice: Subject to any disclaimer, the term of this patent is extended or adjusted under 35 U.S.C. 154(b) by 0 days.

(21) Appl. No.: 09/535,596

(22) Filed: Mar. 27, 2000

(51) Int. Cl.⁷ ...................................................... F04B 17/00
(52) U.S. Cl. ..................... 417/410.5; 417/410; 418/151; 418/55.6; 418/55; 418/94; 418/55.1
(58) Field of Search ........................... 417/410.5; 418/151

(56) References Cited

U.S. PATENT DOCUMENTS

| | | | |
|---|---|---|---|
| 3,952,612 | * 4/1976 | Kurkowski et al. | 74/573 |
| 4,439,118 | * 3/1984 | Iimori | 418/55 |
| 5,336,060 | * 8/1994 | Tomell et al. | 417/410 |
| 5,476,369 | * 12/1995 | Fowlkes et al. | 417/410.5 |

* cited by examiner

Primary Examiner—Charles G. Freay
Assistant Examiner—E D Hayes
(74) Attorney, Agent, or Firm—Carlson, Gaskey & Olds

(57) ABSTRACT

Counterweight size is reduced by removing material from an electric motor rotor for a machine, such as a compressor. The material is removed asymmetrically with respect to shaft centerline to provide maximum benefit. Counterweight size reduction results in decrease of compressor dimensional envelope and weight.

11 Claims, 2 Drawing Sheets

COUNTERWEIGHT OF REDUCED SIZE

BACKGROUND OF THE INVENTION

This invention relates to reduction of counterweight size in electric motor driven rotating machinery. Counterweights are used widely in rotating machinery applications to counteract unbalanced forces of eccentrically rotated machinery components. Known counterweights often occupy a substantial amount of space within a rotating machinery extending both radially outward of the rotating shaft and axially along the shaft length. Examples of such rotating machinery for air conditioning and refrigeration application include scroll and rotary vane compressors.

While this invention is equally applicable to both scroll and rotary vane compressor, the application of this idea is illustrated on a scroll compressor. It should be understood that a worker of ordinary skill in the art would recognize the application of this idea to other types of compressors.

Scroll compressors are widely utilized in refrigerant compression applications. In a scroll compressor, a pair of scroll members each have a base and generally spiral wrap extending from the base. The wraps interfit to define compression chambers. One of the two scroll members is driven by a rotating shaft to orbit relative to the other. Because the orbiting scroll is positioned eccentrically on the rotating shaft, the scroll orbiting movement creates force imbalance. Scroll compressors have historically been manufactured with a relatively massive counterweight attached to the shaft or electric motor rotor to counteract this force imbalance and thus minimize scroll compressor vibration.

It is often desirable to reduce the required housing size of scroll compressors. However, the relatively massive counterweight has restricted the ability to reduce the size of the scroll compressor housing.

SUMMARY OF THE INVENTION

In a disclosed embodiment of this invention, the counterweight size is reduced by removing material in the motor rotor which drives the shaft. By removing material at a position circumferentially spaced from the counterweight location, the force which must be offset by the counterweight is reduced. The prior art has sometimes drilled cooling holes through the electric motor rotor. However, these known cooling holes have been symmetrically located around the rotor perimeter. The present invention does not use symmetrically located holes, and thus the prior art is not applicable to this invention.

In one embodiment of this invention, holes are machined to extend axially along the axis of the rotor. The holes may extend entirely through the length of the rotor, or for only a portion of the length. Preferably there are plural holes. The holes are preferably clustered on one side of the rotor, and more preferably over an arc of a relatively small circumferential extent. The holes are preferably located near the rotor bore, such that they have minimal impact on the motor electromagnetic field. Proper hole positioning reduces the counterweight size. In some applications, it may be possible to entirely eliminate the need for the counterweight.

In a second embodiment of this invention, a first portion of the outer periphery of rotor end ring is cut away. This portion is cut away on the side of rotor end ring opposite to the counterweight location. A second portion of the rotor end ring may also be cut away on the same side as the counterweight and receive a relatively small tooth shaped portion of counterweight. In this embodiment, the counterweight tooth fits downwardly into a notch in the outer periphery of the rotor.

In this embodiment, the additional space occupied by the counterweight is reduced by having the above-mentioned modifications to the rotor end rings and the counterweight. This occurs because the first portion of the rotor end ring is removed on the side opposite to the counterweight and the second portion of rotor end ring is filled the counterweight tooth whose density is much higher (typically copper material) than the density of the rotor end ring (typically aluminum material).

In either embodiment, the present invention reduces the space occupied by the counterweight.

These and other features of the present invention can be best understood from the following specification and drawings, the following of which is a brief description.

DETAILED DESCRIPTION OF A PREFERRED EMBODIMENT

Figure 1:
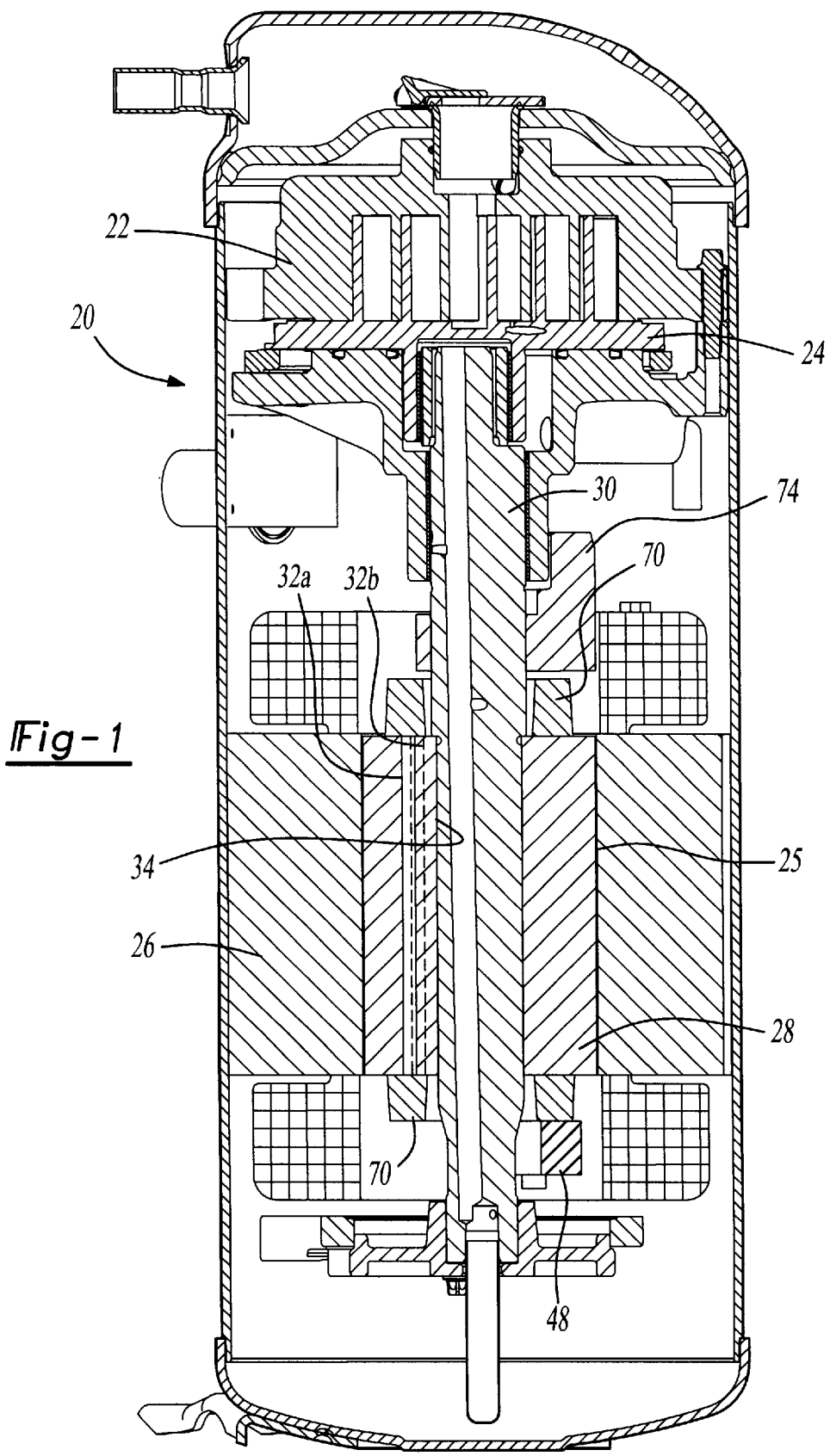
FIG. 1 shows a scroll compressor incorporating a first embodiment of this invention.

The scroll compressor 20 is illustrated in FIG. 1 having a non-orbiting scroll member 22 and an orbiting scroll member 24. As is known, the scroll members each include spiral wraps which interfit to define compression chambers. A shaft 30 drives the orbiting scroll member to orbit relative to the non-orbiting scroll member. A motor 25 drives the shaft, and includes a stator 26 and a rotor 28. Rotor 28 has end rings 70.

The rotor 28 is formed with holes 32a and 32b that counteract imbalance force caused by the orbiting movement of the orbiting scroll 24. The shaft 30 is secured in a bore 34 of the rotor 28.

Figures 2, 3:
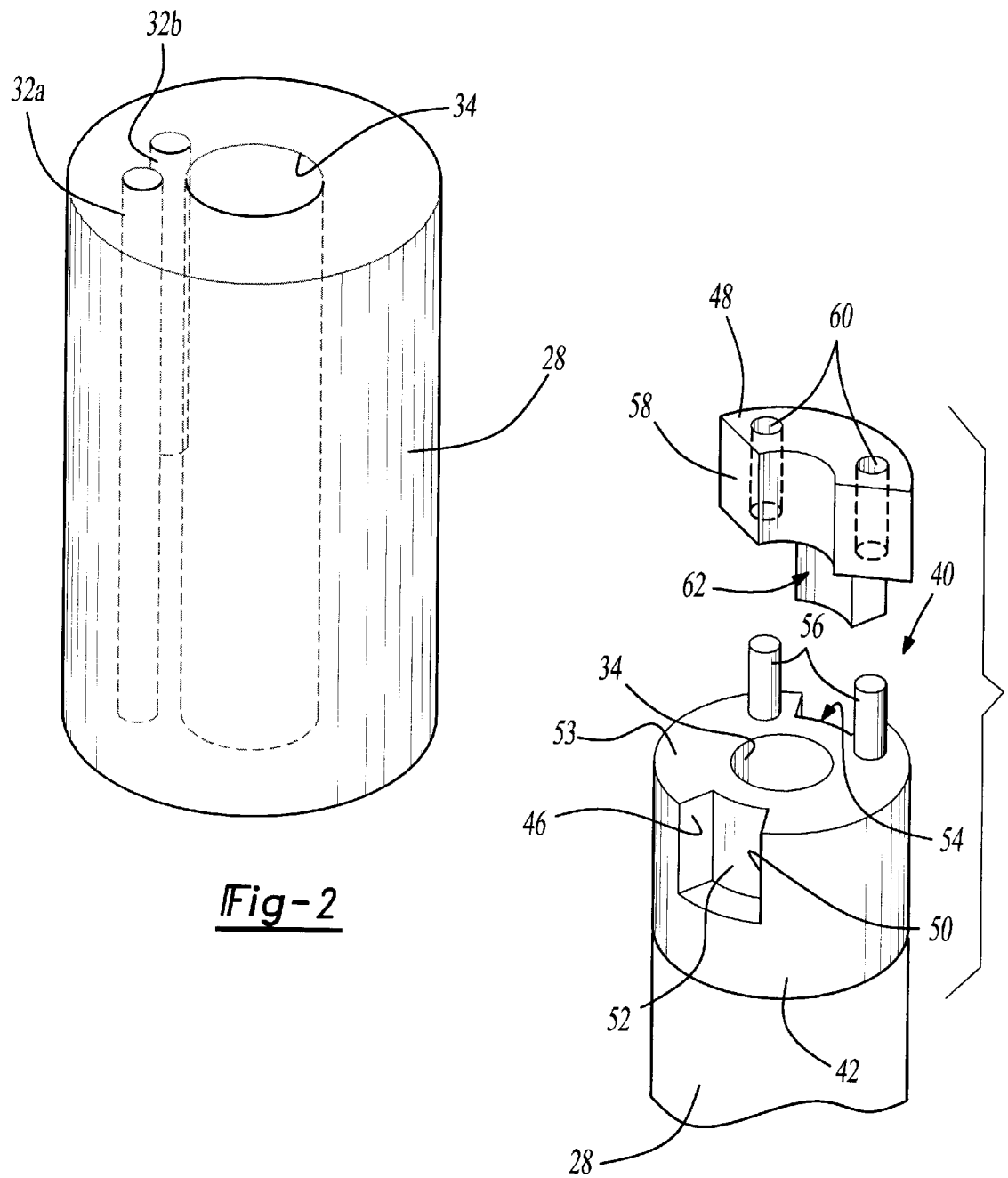
FIG. 2 is a detail of the first embodiment.
FIG. 3 shows a second embodiment.

As shown in FIG. 2, the rotor 28 is formed with a plurality of through holes 32a and 32b. As can be seen, the holes are generally located over a limited circumferential extent of the rotor, which is preferably less than 90°. In the past, rotors have been provided with through holes for cooling purposes. However, those holes have been symmetrically located with respect to rotor centerline. The present invention reduces the need for a counterweight 76, and may even completely eliminate the need for a counterweight by removing material at selected circumferential locations in the rotor. One of the holes is shown extending through the rotor and the other is shown ending within the length of the rotor. The through hole 32a is in general parallel to the rotational axis of the rotor 28 and extends throughout the entire length of the rotor 28. The hole 32b is shown to dead end within the length of the rotor. That is, it does not extend throughout the entire length of the rotor. The use of these options allows the scroll compressor designer the ability to carefully design the amount of material which is removed, and the location of the removed material as required by a particular application.

A second embodiment 40 is illustrated in FIG. 3. The rotor has end rings 42 located at opposite ends of rotor 28. The counterweight 74 can be attached directly to the shaft or the counterweight 48 can be attached to the end ring. In the second embodiment 40, the rotor end ring 42 is formed with a pair of notches 54 and 46 at an outer peripheral surface. A bore 34 receives the shaft. Notch 46 is preferably left empty, and thus reduces the size of an opposed counterweight 48. Notch 46 has side walls 50 and a rear wall 52. Counterweight 48 is formed with a tooth 62 that fits into notch 54.

As also shown, pins 56 extend upwardly into openings 60 and keep counterweight 48 pressed against the end face 53 of rotor end ring 42.

The counterweight is formed of a material that is denser than the rotor ring portion. Thus, the counterweight axial extension 62 extending beyond the end ring end face 53 reduces the necessary size of the counterweight.

In both embodiments, the radial or axial size of the counterweight is reduced by removing material from the rotor at a location opposed to the normal location for the counterweight. As is known, designing the size and location of the counterweight is a portion of the design process for a scroll compressor. The counterweight should be located to properly balance the imbalance force caused by the orbiting movement of the orbiting scroll 24.

The reduction in the counterweight size allows the reduction of the overall compressor size and weight.

Although preferred embodiments of this invention have been disclosed, it should be understood that a worker in this art would recognize that modifications will come within the scope of this invention. For that reason, the following claims should be studied to determine the true scope and content of this invention.

What is claimed is:

1. A scroll compressor comprising:
   a first scroll member having a base and a generally spiral wrap extending from said base;
   a second scroll member having a base and a generally spiral wrap extending from said base, said wrap of said first and second scroll members interfitting to define compression chambers;
   a shaft operably connected to cause said second scroll member to orbit relative to said first scroll member;
   an electric motor for driving said shaft about a rotational axis, said electric motor incorporating a stator and a rotor, said rotor being fixed to rotate with said shaft; and
   material removed from a portion of said rotor to assist in balancing forces during orbital movement of said orbiting scroll member, said removed material being non-symmetrical about a rotational axis of said rotor, and said removed material being removed as holes each formed entirely within a 90 degree circumferential section of said rotor.

2. A scroll compressor as recited in claim 1, wherein there are a plurality of said holes.

3. A scroll compressor as recited in claim 1, wherein said holes extend through the entire length of said rotor.

4. A scroll compressor as recited in claim 1, wherein said holes extend for only a portion of the length of said rotor.

5. A scroll compressor as recited in claim 1, wherein said removed material is formed by a notch at a circumferential location generally 180° opposite to the counterweight located closest to the notch circumferential location.

6. A scroll compressor as recited in claim 5, wherein said removed material is formed by a notch at circumferential location generally coinciding with the counterweight location and a counterweight extension being mounted in said notch.

7. A scroll compressor as recited in claim 5, wherein said counterweight is formed of a material which is denser than the material of the rotor end.

8. A scroll compressor as recited in claim 7, wherein said counterweight extension includes a tooth protruding downwardly into said notch.

9. A scroll compressor as recited in claim 7, wherein said rotor includes a plurality of pins extending upwardly into openings in said counterweight to assist in positioning said counterweight on said shaft.

10. A scroll compressor comprising:
    a first scroll member having a base and a generally spiral wrap extending from said base;
    a second scroll member having a base and a generally spiral wrap extending from said base, said wrap of said first and second scroll members interfitting to define compression chambers;
    a shaft operably connected to cause said second scroll member to orbit relative to said first scroll member;
    an electric motor for driving said shaft about a rotational axis, said electric motor incorporating a stator and a rotor, said rotor being fixed to rotate with said shaft; and
    material removed from a portion of said rotor to assist in balancing forces during orbital movement of said orbiting scroll member, said removed material being non-symmetrical about said rotational axis, said removed material being formed by a plurality of holes, and not being symmetric about said rotational axis, and said holes extending generally parallel to said rotational axis and said holes each formed entirely within a 90 degree circumferential section of said rotor.

11. A compressor comprising:
    a compressor pump unit;
    a shaft operably connected to drive said compressor pump unit;
    an electric motor for driving said shaft about a rotational axis, said electric motor incorporating a stator and a rotor, said rotor being fixed to rotate with said shaft; and
    material removed from a portion of said rotor to assist imbalancing forces during operation of said compressor pump unit, said removed material be non-symmetrical about said rotational axis of said rotor, said removed material being provided by a plurality of holes each formed within a 90 degree circumferential section of said rotor.

* * * * *

UNITED STATES PATENT AND TRADEMARK OFFICE
CERTIFICATE OF CORRECTION

PATENT NO. : 6,305,914 B1
DATED : October 23, 2001
INVENTOR(S) : Lifson

It is certified that error appears in the above-identified patent and that said Letters Patent is hereby corrected as shown below:

<u>Column 4,</u>
Line 6, should read as follows:

7.    A scroll compressor comprising;
a first scroll member having a base and a generally spiral wrap extending from said base;
a second scroll member having a base and a generally spiral wrap extending from said base, said wrap of said first and second scroll members interfitting to define compression chambers;
a shaft operably connected to cause said second scroll member to orbit relative to said first scroll member; and
an electric motor for driving said shaft about a rotational axis, said electric motor incorporating a stator and a rotor, said rotor being fixed to rotate with said shaft;
material removed from a portion of said rotor to assist in balancing forces during orbital movement of said orbiting scroll member, said removed material being non-symmetrical about a rotational axis of said rotor, said removed material being formed at the rotor ends, said removed material formed by a notch at a circumferential location generally 180º opposite to the counterweight located closest to the notch circumferential location.

Signed and Sealed this

Ninth Day of July, 2002

*Attest:*

JAMES E. ROGAN
*Attesting Officer*     *Director of the United States Patent and Trademark Office*